United States Patent Office 3,504,020
Patented Mar. 31, 1970

3,504,020
**PROSTAGLANDIN THIOSEMICARBAZONES,
1-ESTER AND 1-CARBINOL DERIVATIVES
THEREOF**
Milton Lapidus, Rosemont, Norman H. Grant, Wynnewood, Marvin E. Rosenthale, Havertown, and Harvey E. Alburn, West Chester, Pa., assignors to American Home Products Corporation, New York, N.Y., a corporation of Delaware
No Drawing. Filed Oct. 4, 1967, Ser. No. 672,697
Int. Cl. C07c *159/00, 59/18;* A61k *27/00*
U.S. Cl. 260—514                    2 Claims

ABSTRACT OF THE DISCLOSURE

Novel thiosemicarbazones of prostaglandins, 1 - esters and 1 - carbinols thereof (I) are prepared by treating prostaglandins and their 1-ester and 1-carbinol derivatives (II) with a thiosemicarbazide (III). Compounds (I) have valuable pharmacological properties, especially as bronchodilators.

---

This invention relates to novel derivatives of prostaglandins. More particularly, it is concerned with prostaglandin thiosemicarbazones, 1-ester and 1-carbinol derivatives thereof, which have valuable pharmacological properties, especially as bronchodilators.

BACKGROUND OF THE INVENTION

A number of drugs in a variety of combinations and dosage forms are currently available as bronchodilators, i.e.: substances able to relax the smooth muscle of the bronchial tree and thus control spasm and facilitate breathing in conditions such as bronchial asthma, bronchitis, bronchiectasis, pneumonia and emphysema. All of the bronchodilator preparations incorporate one or more of 3 basic types of compounds: (a) sympathomimetic (adrenergic) agents, (b) xanthine derivatives and (c) corticosteroids. These drugs can be used in combination with antitussives, expectorants, mucolytics, etc.

The sympathomimetic agents most often used are epinephrine, isoproterenol, phenylephrine and ephedrine These adrenergic agents are the most powerful and most useful drugs in the relief of severe asthmatic spasm (status asthmaticus), however, as with other dilators they have various side effects. Some of the more important untoward effects are stimulation of the cardiovascular and central nervous system, hyperglycemia and tolerance (tachyphylaxis), which greatly reduces effectiveness. The discovery of the bronchodilator activity of isoproterenol stimulated synthesis of new sympathomimetic agents with more selective bronchodilator activity. The structural requirements for action on the beta-receptors of both the bronchial musculature and the cardiovascular system appear similar and dissociation of these two effects has, thus far, not been demonstrated.

The two xanthine derivatives most widely used are theophylline and aminophylline. Some of the problems associated with therapy here include variable oral absorption, cardiovascular effects and inability to achieve adequate dosage levels without gastric irritation. The xanthines are not as active as the sympathomimetics in acute situations and can be quite dangerous when administered intravenously.

Many cases of asthma and status asthmaticus refractory to usual treatment methods are now controlled by the corticosteroids. The mechanism by which the steroids are effective is not known, however, it is thought that their marked effectiveness in preventing capillary permeability changes may reduce swelling in the bronchial tract and thus serve to restore normalcy. The anti-immune activity of the corticosteroids may also be extremely important in asthma, which is an allergic disease. Long term treatment of asthma with steroids involves the risk of sodium retention, hypertension, ulcers, calcium loss from osseous structures and other well known side effects.

All of these drugs are available in a variety of dosage forms, the oral route being used primarily for maintenance therapy while injectables tend to be used in acute emergency situations. Inhalation (aerosols and solution for nebulizers) are faster acting than oral but slower than injectables and are now being used together with sympathomimetics and corticosteroids either for maintenance or moderately acute-stage therapy. Isoproterenol is the leading inhalant used at the present time.

The asthmatic patient obviously presents the physician with a great number of therapeutic choices, none completely satisfactory. Since no drug or combination currently fulfills all the needs of the asthmatic or person with maintenance benefits safely, the pattern of drug therapy in this area promises to remain as uncertain and complicated as it presently is.

Thus, the agents available to now have a number of problems associated with their use, including toxicity, low activity (especially in the xanthines), adverse effect on the cardiovascular system (especially in the sympathomimetics) and fluid retention or edema (with the corticosteroids). An addition to the collection of agents to treat bronchial spasm would clearly be welcome. It is clear, therefore, that a definite need exists for means employing an effective and well-tolerated bronchodilating agent.

It is, accordingly, a primary object of this invention to provide compounds which relieve bronchial spasm and facilitate breathing.

It is another object of this invention to provide new bronchial smooth muscle dilators which are non-steroidal, non-catecholamine and non-xanthine.

It is still a further object of this invention to provide compounds to relieve bronchial spasm characterized by rapid onset of action, long action and a good degree of tolerance.

Still another object of this invention is to provide compounds to relieve bronchial spasm, which can be administered in therapy by the oral inhalation route.

DESCRIPTION OF THE INVENTION

These and other objects readily apparent to those skilled of the instant invention which are, in essence: a prostain the art are easily obtained by use of the compounds glandin thiosemicarbazone, 1-ester or 1-carbinol derivative of Formula I:

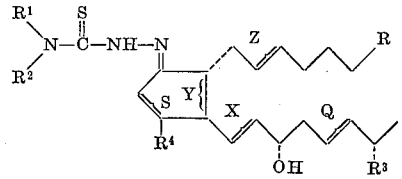

I wherein

R is —$CO_2H$, —$CO_2$(lower)alkyl or —$CH_2OH$;
$R^1$ and $R^2$ are hydrogen, (lower)alkyl, phenyl, hydroxyphenyl, carbamylphenyl, aminophenyl, mono(lower) alkylaminophenyl or di(lower)alkylaminophenyl;
$R^3$ and $R^4$ are hydrogen or alpha-hydroxyl; and
S and Y are single or double bonds;
X is a single bond or a trans-double bond; and
Q and Z are single bonds or cis-double bonds.

Special mention is made of one particularly valuable embodiment of this invention. This is the highly active compound: 7-(3α-hydroxy-2-(3-hydroxy-1-octenyl)-5-oxocyclopentenyl)-5-heptenoic acid thiosemicarbazone, also designated PGE$_2$-thiosemicarbazone, a compound of Formula I wherein R is —CO$_2$H; R$^1$, R$^2$ and R$^3$ are hydrogen; R$^4$ is alpha-hydroxyl; S, Y and Q are single bonds and X is a trans-double bond and Z is a cis-double bond.

When used herein in the appended claims, the term "(lower)alkyl" contemplates alkyl radicals, straight and branched chain, of from about 1 to about 6 carbon atoms. Illustrative (lower)alkyl groups therefore include methyl, ethyl, n-propyl, i-propyl, n-butyl, t-butyl, n-pentyl, 2-methylpentyl, n-hexyl and the like.

The compounds of Formula I herein are prepared by reacting a prostaglandin, 1-(lower)alkyl ester or 1-carbinol derivative of Formula II

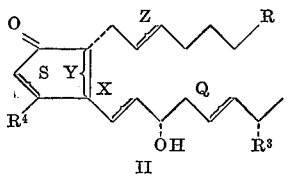

wherein R, R$^3$, R$^4$, Q, S, X, Y and Z are as defined under Formula I hereinabove with a thiosemicarbazide of Formula III

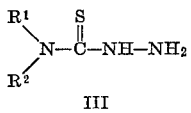

wherein R$^1$ and R$^2$ are as defined under Formula I hereinabove, preferably in the presence of an acidic condensation catalyst, such as dilute mineral acid or an organic carboxylic acid, until formation of a thiosemicarbazone compound of Formula I is substantially complete, and recovering said thiosemicarbazone.

Starting materials of Formula II, the prostaglandins, 1-(lower)alkyl esters and 1-carbinol derivatives thereof, are prepared in known ways either by isolating the prostaglandins from natural sources, for example, the vesicular glands of sheep; or by enzymatic conversion (biosynthesis) from fatty acid substrates, such as arachidonic acid and, depending on the substituents desired, chemically transforming double bonds to single bonds by hydrogenation, converting keto groups to hydroxymethylene groups by reduction, dehydrating to introduce double bonds, esterifying carboxyl groups to provide carbo(lower)alkoxyl groups by treatment, for example, with diazo(lower)alkanes, such as diazomethane, and forming carbinol derivatives such as, for example, by treating a carbo(lower)alkoxyl group with an alkali metal alumino hydride reducing agent, such as lithium aluminum hydride. Specific methods useful to provide all of the compounds of Formula II are found in S. Bergstrom, Science, 157, 382 (1967); C. B. Struijk, R. K. Beerthius, H. J. Pabon and D. C. Van Dorp, Recueil, 85, 1233 (1966); M. Hamberg and B. Samuelsson, Biochim. Biophys. Acta, 106, 215–217 (1965); B. Samuelsson, Angew. Chem. inter. Edit., 4, 410 (1965); E. W. Horton, Experientia, 21, 113–176 (1965); H. J. J. Pabon, L. Van Der Wolf and D. A. Van Dorp, Recueil, 85, 1251 (1966); J. F. Bagli, T. Bogri and R. Deghenghi, Tetrahedron Letters No. 5, p. 465 (1966); and references cited therein as well as the copending patent application of M. Lapidus, N. H. Grant and H. E. Alburn, U.S. Ser. No. 617,061, filed Feb. 20, 1967.

The thiosemicarbazides of Formula III are commercially available in some instances or are easily prepared by techniques known to those skilled in the art. In general they are prepared by reacting a suitably substituted thiourea with hydrazine; or a substituted isothiocyanate or isothiocyanic acid with hydrazine—methods useful for preparing thiosemicarbazides of Formula III are reviewed in detail by E. E. Reid in Organic Chemistry of Bivalent Sulfur, Vol. V, Chemical Publishing Co. Inc., New York, N.Y. 1963, p. 194.

In one manner of preparing the compounds of Formula I, a solution or suspension of the thiosemicarbazide of Formula III in a diluent such as water or a lower alkanol, such as methanol, is added to a stoichiometrically-equivalent amount of the prostaglandin or derivative of Formula II and then a small amount of an acid, such as acetic acid is added. The mixture is warmed, e.g., to about 40° C., then allowed to stand for about 48 hours at a temperature of about 22° C. until formation of the compound of Formula I is substantially complete. The product can be recovered in any convenient manner. For example, the reaction mixture can be treated with water (about 50% by volume) and cooled and scratched to induce the deposition of crystals of product. These can be collected and dried. If desired, further purification can be effected by recrystallization from a lower alcohol, such as methanol, or a mixture of a lower alcohol and water; methanol and water, mixed in a 10–30 proportion by volume, is especially effective as a recrystallization solvent.

Administration of compounds of Formula I of this invention to animals suffering from bronchial spasm provides relief in asthma, emphysema, bronchitis and like conditions wherever highly potent bronchodilating agents are used.

Compounds of Formula I can be administered in a variety of dosage forms, the oral route being used primarily for maintenance therapy while injectables tend to be more useful in acute emergency situations. Inhalation (aerosols and solution for nebulizers) seems to be somewhat faster acting than other oral forms but slower than injectables and this method combines the advantages of maintenance and moderately-acute stage therapy in one dosage unit.

The daily dose requirements vary with the particular composition being employed and the severity of the symptoms being presented. The dosage varies with the size of the patient. With large animals, by the oral inhalation route, with, for example, a hand nebulizer or a pressurized aerosol dispenser the ordinarily effective dose is from about 2000 micrograms to about 6000 micrograms of the instant compounds every four hours, as needed. By the oral ingestion route, preferably sublingually, the effective dose is from about 100 to about 400 mg., preferably from about 200 to about 300 mg. up to a total of about 1200 mg. per day. By the intravenous route, the ordinarily effective dose is from about 2000 micrograms to about 10,000 micrograms, preferably about 7000 micrograms per day.

For dosage units, the compounds of Formula I can be compounded into any of the usual oral dosage forms including tablets, capsules and liquid preparations such as elixirs and suspensions containing various coloring, flavoring, stabilizing and flavor masking substances. For compounding oral dosage forms the active ingredient can be diluted with various tableting materials such as starches of various types, calcium carbonate, lactose, sucrose and dicalcium phosphate to simplify the tableting and capsulating process. A minor proportion of magnesium stearate is useful as a lubricant.

For administration by the oral inhalation route with conventional nebulizers or by oxygen aerosolization it is convenient to provide the compound of Formula I in dilute aqueous solution or suspension presumably at concentrations of about 1 part of medicament to from about 100 to 200 parts by weight of total preparation. Entirely conventional additives may be employed to stabilize these preparations or to provide isotonic media, for example, sodium chloride, sodium citrate, citric acid, sodium bisulfite, and the like may be used.

For administration as a self-propelled dosage unit for administering the medicament in aerosol form suitable for inhalation therapy the compounds can be used in compositions comprising the medicament suspended in an inert propellant (such as a mixture of dichlorodifluoromethane and dichlorotetrafluoroethane) together with a co-solvent, such as ethanol, flavoring materials and stabilizers. Instead of a co-solvent there can also be used a dispersing agent such as oleyl alcohol. Suitable means to employ the aerosol inhalation therapy technique are described fully in U.S. 2,868,691 and 3,095,355.

DESCRIPTION OF THE PREFERRED EMBODIMENTS

The following examples are given simply to illustrate this invention, but not in any way to limit its scope.

chiometrically-equivalent amounts of the corresponding suitably-substituted thiosemicarbazides. The following prostaglandin thiosemicarbazones and 1-ester and 1-carbinol derivatives thereof are obtained:

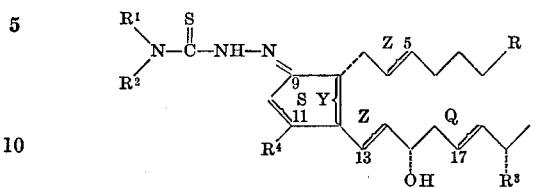

| R | $R^1$ | $R^2$ | $R^3$ | $R^4$ | Q | S | X | Y | Z |
|---|---|---|---|---|---|---|---|---|---|
| —CO₂H | CH₃ | CH₃ | H | —OH(α) | s.b. | s.b. | t.d.b. | s.b. | c.d.b. |
| —CO₂H | CH₃(CH₂)₄CH₂— | CH₃(CH₂)₄CH₂ | H | —OH(α) | s.b. | s.b. | t.d.b. | s.b. | c.d.b. |
| —CO₂H | H₂N—C₆H₄— | H₂N—C₆H₄— | H | —OH(α) | s.b. | s.b. | t.d.b. | s.b. | c.d.b. |
| —CO₂H | C₆H₅— | C₆H₅— | H | —OH(α) | s.b. | s.b. | t.d.b. | s.b. | c.d.b. |
| —CO₂H | HO—C₆H₄— | HO—C₆H₄— | H | —OH(α) | s.b. | s.b. | t.d.b. | s.b. | c.d.b. |
| —CO₂H | CH₃(H)N—C₆H₄— | CH₃(H)N—C₆H₄— | H | —OH(α) | s.b. | s.b. | t.d.b. | s.b. | c.d.b. |
| —CO₂H | (CH₃)₂N—C₆H₄— | (CH₃)₂N—C₆H₄— | H | —OH(α) | s.b. | s.b. | t.d.b. | s.b. | c.d.b. |
| —CO₂H | H₂NCO—C₆H₄— | H₂NCO—C₆H₄— | H | —OH(α) | s.b. | s.b. | t.d.b. | s.b. | c.d.b. |
| —CO₂CH₃ | H | H | H | —OH(α) | s.b. | s.b. | t.d.b. | s.b. | c.d.b. |
| —CO₂CH₂(CH₂)₄CH₃ | H | H | H | —OH(α) | s.b. | s.b. | t.d.b. | s.b. | c.d.b. |
| —CH₂OH | H | H | H | —OH(α) | s.b. | s.b. | t.d.b. | s.b. | c.d.b. |
| —CO₂H | H | H | H | —OH(α) | s.b. | s.b. | t.d.b. | s.b. | s.b. |
| —CO₂H | H | H | H | —OH(α) | c.d.b. | s.b. | t.d.b. | s.b. | c.d.b. |
| —CO₂H | H | H | H | H | s.b. | s.b. | t.d.b. | d.b. | s.b. |
| —CO₂H | H | H | H | H | s.b. | s.b. | t.d.b. | d.b. | c.d.b. |
| —CO₂H | H | H | H | H | c.d.b. | s.b. | t.d.b. | d.b. | c.d.b. |
| —CO₂H | H | H | H |  | s.b. | d.b. | t.d.b. | s.b. | s.b. |
| —CO₂H | H | H | H |  | s.b. | d.b. | t.d.b. | s.b. | c.d.b. |
| —CO₂H | H | H | H |  | c.b.d. | d.b. | t.d.b. | s.b. | c.d.b. |
| —CO₂H | H | H | H |  | s.b. | s.b. | s.b. | s.b. | s.b. |
| —CO₂H | H | H | H | —OH(α) | s.b. | s.b. | t.d.b. | d.b. | s.b. |
| —CO₂H | H | H | H | —OH(α) | s.b. | d.b. | t.d.b. | d.b. | c.d.b. |
| —CO₂H | H | H | —OH(α) | —OH(α) | s.b. | d.b. | t.d.b. | s.b. | s.b. |
| —CO₂H | H | H | H | —OH(α) | s.b. | d.b. | t.d.b. | s.b. | c.d.b. | s.b., single bond, —CH₂CH₂—; d.b., double bond, —CH=CH—; t.d.b., trans-double bond; c.d.b., cis-double bond.

EXAMPLE 1

7-[3α-hydroxy-2(3-hydroxy-1-octenyl)-5-oxocyclopentenyl]-5-heptenoic acid thiosemicarbazone A solution of 0.250 g. of thiosemicarbazide in 10 ml. of water is added to 0.429 g. of 7-[3-[3-hydroxy-1-octenyl)-5-oxocyclopentyl] - 5 - heptenoic acid (PGE₂, prepared according to Example 1 of U.S. patent application, Ser. No. 617,061, filed Feb. 20, 1967) dissolved in 10 ml. of methanol. One drop of glacial acetic acid is added; the solution warmed to 40° C., filtered and allowed to stand at 25° C. for two days. The addition of 10 ml. of water initiates crystallization. After the addition of another 10 ml. of water and cooling in an ice bath for one hr., the crystalline product is collected and recrystallized from methanol:water (10:30 v./v.). The crystals are dried at 56° C., yield, 0.313 g., M.P., 126–128° C.

*Analysis.*—Calcd. for $C_{21}H_{35}N_3O_4S$ (percent): C, 59.3; H, 8.2; S, 7.5. Found (percent): C, 59.2; H, 8.3; S, 7.5.

EXAMPLE 2

The procedure of Example 1 is repeated substituting for the PGE₂, stoichiometrically-equivalent amounts of the corresponding suitably-substituted prostaglandins or esters or carbinols and for the thiosemicarbazide, stoi-

What is claimed is:
1. A compound of the formula

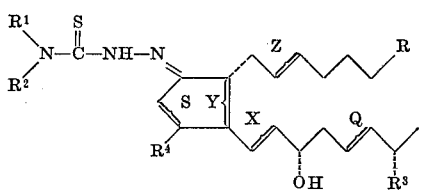

wherein
R is —CO₂H, —CO₂(lower)alkyl or —CH₂OH;
$R^1$ and $R^2$ are hydrogen, (lower)alkyl, phenyl, hydroxyphenyl, carbamylphenyl, aminophenyl, mono-(lower) alkylaminophenyl or di(lower)alkylaminophenyl;
$R^3$ and $R^4$ are hydrogen or alpha-hydroxyl; and
S and Y are single or double bonds;
X is a single bond or a trans-double bond; and
Q and Z are single bonds or cis-double bonds.

2. A compound as defined in claim 1 wherein R is —CO₂H; $R^1$, $R^2$ and $R^3$ are hydrogen; $R^4$ is alpha-hydroxyl; S, Y and Q are single bonds and X is a trans-double bond and Z is a cis-double bond.

References Cited

UNITED STATES PATENTS 3,432,541   3/1969   Bagli et al. _____ 260—468

JAMES A. PATTEN, Primary Examiner

WILLIAM T. CHOCTAW, Assistant Examiner

U.S. Cl. X.R.

260—468, 514, 552; 424—305, 323

PO-1050
(5/69)

UNITED STATES PATENT OFFICE
CERTIFICATE OF CORRECTION

Patent No. 3,504,020                    Dated   March 31, 1970

Inventor(s)  (1) Lapidus, Milton        (3) Rosenthale, Marvin E.
             (2) Grant, Norman H.       (4) Alburn, Harvey E.

It is certified that error appears in the above-identified patent and that said Letters Patent are hereby corrected as shown below:

Column 2, lines 47 and 48, reversed, should read:

- - ...in the art are easily obtained by use of the compounds of the instant invention which are, in essence: a prosta- ... - -

Column 6, line 5, the formula should read:

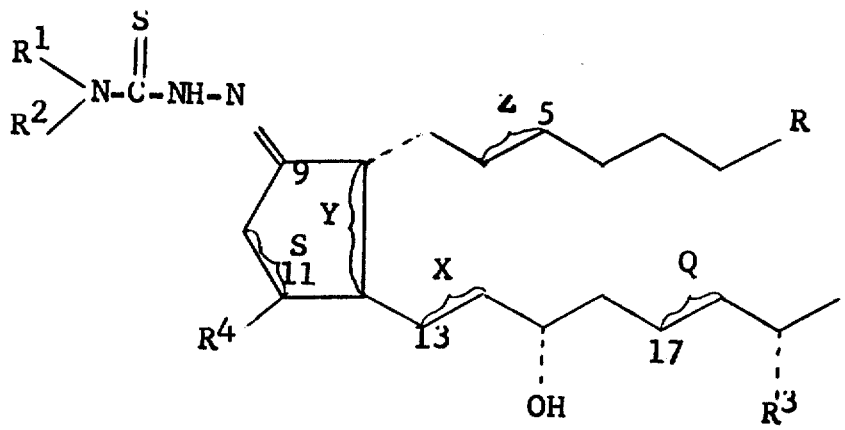

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents